United States Patent [19]
Schlosser et al.

[11] Patent Number: 5,873,355
[45] Date of Patent: Feb. 23, 1999

[54] GRILL WITH IMPROVED PORTABILITY AND STORAGE CONFIGURATION

[75] Inventors: Erich J. Schlosser, Barrington; James C. Stephen, Arlington Heights, both of Ill.

[73] Assignee: Weber-Stephen Products Co., Palatine, Ill.

[21] Appl. No.: 523,029

[22] Filed: Sep. 1, 1995

[51] Int. Cl.⁶ .................................................. F24C 3/00
[52] U.S. Cl. .......................... 12/41 R; 126/38; 126/39 N; 126/50; 211/150; 431/343; 431/344
[58] Field of Search ................................. 126/39 R, 41 R, 126/337 R, 338, 334, 332, 40, 9 R, 50, 39 N; 248/313, 240.3, 240; 99/449–450; 108/77, 79, 80; 211/150, 99; 431/343, 344

[56] References Cited

U.S. PATENT DOCUMENTS

| | | |
|---|---|---|
| D. 293,067 | 12/1987 | Stephen et al. . |
| D. 298,406 | 11/1988 | Stephen et al. . |
| D. 316,355 | 4/1991 | Stephen et al. . |
| 596,975 | 1/1898 | Bent .......................................... 108/80 |
| 1,106,569 | 8/1914 | Kessler ..................................... 211/150 |
| 1,224,157 | 5/1917 | Fry . |
| 1,833,147 | 11/1931 | Atkinson .................................... 211/99 |
| 2,207,307 | 7/1940 | Teller et al. . |
| 2,304,140 | 12/1942 | Bergholm . |
| 2,484,239 | 10/1949 | Moon et al. . |
| 2,530,166 | 11/1950 | Johannsen . |
| 2,541,528 | 2/1951 | McAvoy . |
| 2,742,893 | 4/1956 | Keffer ...................................... 126/38 |
| 2,780,474 | 2/1957 | Farah et al. . |
| 2,787,995 | 4/1957 | Alter . |
| 2,886,386 | 5/1959 | Spitzer . |
| 3,124,057 | 3/1964 | Kiser . |
| 3,421,458 | 1/1969 | Salkoff et al. ........................... 211/150 |
| 3,545,908 | 12/1970 | Lohman . |
| 3,586,518 | 6/1971 | Folmar . |
| 3,683,791 | 8/1972 | Rast, Jr. . |
| 3,802,413 | 4/1974 | Pepin . |
| 3,824,984 | 7/1974 | Swanson et al. . |
| 4,089,258 | 5/1978 | Berger . |
| 4,108,142 | 8/1978 | Barson et al. . |
| 4,321,857 | 3/1982 | Best . |

(List continued on next page.)

FOREIGN PATENT DOCUMENTS

| | | |
|---|---|---|
| 46671 | 8/1947 | Australia . |
| 34964/89 | 12/1989 | Australia . |
| 991496 | 6/1976 | Canada . |
| 2582086 | 11/1986 | France . |
| 465841 | 9/1928 | Germany . |
| 38189 | 4/1936 | Netherlands . |
| 143701 | 11/1919 | United Kingdom . |
| 143701 | 6/1920 | United Kingdom . |
| WO87/00410 | 1/1987 | WIPO . |

*Primary Examiner*—James C. Yeung
*Attorney, Agent, or Firm*—Wallenstein & Wagner, Ltd.

[57] ABSTRACT

A grill 10 is disclosed having: a burner housing 12; a frame 14 to support the burner housing 12; work surfaces 16, 18, and 20; and a gas supply system 22. These components provide a means for relatively easily adjusting the grill 10 between a cooking configuration and a storage configuration. Work surfaces 16 and 18 are positionable between a horizontal cooking position and a vertical storage position. A work surface 20 is removably attachable to grill 10. When work surfaces 16 and 18 are in a vertical position, and the work surface 20 is removed, the burner housing 12 and work surfaces define a first smallest perimeter around the grill. This configuration is ideal for moving and storing the grill 10. Depending on how many of the working surfaces 16, 18, and 20 are in a cooking position, second, third and fourth perimeters are defined. Thus, there is provided ample working surface space with optional reduction thereof for using, moving, and storing the grill 10. The gas supply system 22 includes a gas container or tank 24, a gas manifold 26, a carriage 28 for carrying the tank 24 and securing same to the gill 10. A gas transfer line 30 connects the manifold 26 to tank 24. For convenience and safety, the gas supply system 22 can be removed from the grill 10 as a unit without disconnecting the gas line 30. Also, no tools are needed to remove the gas supply system 22.

33 Claims, 7 Drawing Sheets

U.S. PATENT DOCUMENTS

| | | |
|---|---|---|
| 4,337,751 | 7/1982 | Sampson et al. . |
| 4,350,140 | 9/1982 | Hamilton, Jr. . |
| 4,362,093 | 12/1982 | Griscom . |
| 4,422,435 | 12/1983 | Spell . |
| 4,485,972 | 12/1984 | Freber . |
| 4,488,534 | 12/1984 | Koziol . |
| 4,508,095 | 4/1985 | Bloechel ................................ 126/38 |
| 4,526,532 | 7/1985 | Nelson . |
| 4,583,452 | 4/1986 | Grosse . |
| 4,587,948 | 5/1986 | Haglund . |
| 4,593,676 | 6/1986 | Wackerman . |
| 4,598,676 | 7/1986 | Wackerman . |
| 4,635,613 | 1/1987 | Tucker et al. . |
| 4,662,349 | 5/1987 | McKenzie et al. . |
| 4,665,888 | 5/1987 | Christen, Jr. et al. . |
| 4,677,964 | 7/1987 | Lohmeyer et al. . |
| 4,686,957 | 8/1987 | Koziol . |
| 4,686,958 | 8/1987 | Skelton et al. . |
| 4,688,541 | 8/1987 | Stephen et al. . |
| 4,700,618 | 10/1987 | Cox, Jr. . |
| 4,705,021 | 11/1987 | Beach . |
| 4,718,399 | 1/1988 | Shepard . |
| 4,727,853 | 3/1988 | Stephen et al. . |
| 4,773,319 | 9/1988 | Holland . |
| 4,788,962 | 12/1988 | Mashburn et al. . |
| 4,829,978 | 5/1989 | Schlosser ................................ 126/41 R |
| 4,860,724 | 8/1989 | Schlosser et al. . |
| 4,886,045 | 12/1989 | Ducate, Jr. et al. . |
| 4,899,725 | 2/1990 | Barron ................................ 126/41 R |
| 4,924,846 | 5/1990 | Peacock et al. . |
| 5,016,607 | 5/1991 | Doolittle et al. . |
| 5,033,448 | 7/1991 | Sandweg . |
| 5,050,577 | 9/1991 | Baynes et al. . |
| 5,070,776 | 12/1991 | Schlosser et al. . |
| 5,072,718 | 12/1991 | Seal . |
| 5,076,252 | 12/1991 | Schlosser et al. . |
| 5,076,256 | 12/1991 | Raymer et al. . |
| 5,076,257 | 12/1991 | Raymer et al. . |
| 5,088,470 | 2/1992 | James, Jr. et al. . |
| 5,090,398 | 2/1992 | Raymer et al. . |
| 5,140,973 | 8/1992 | Home . |
| 5,165,385 | 11/1992 | Doolittle et al. . |
| 5,291,875 | 3/1994 | Koziol . |
| 5,323,758 | 6/1994 | Minshall et al. . |
| 5,333,596 | 8/1994 | Clifford . |
| 5,341,793 | 8/1994 | Brown . |
| 5,408,985 | 4/1995 | Giebel et al. . |
| 5,452,707 | 9/1995 | Harris et al. . |

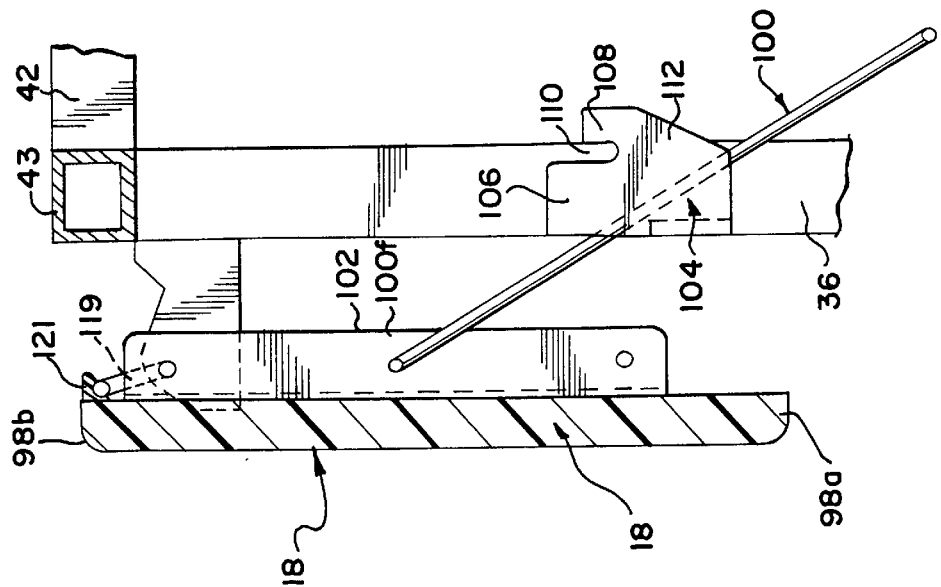
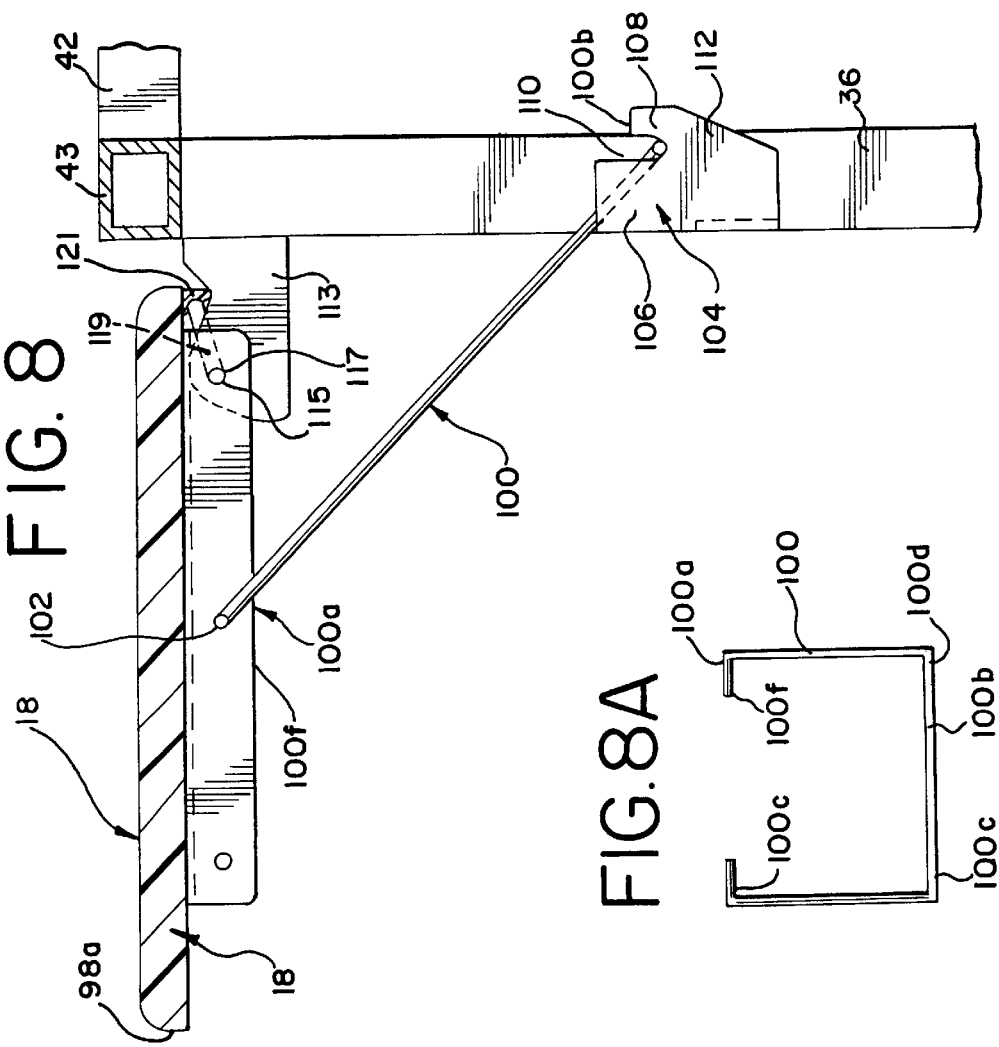

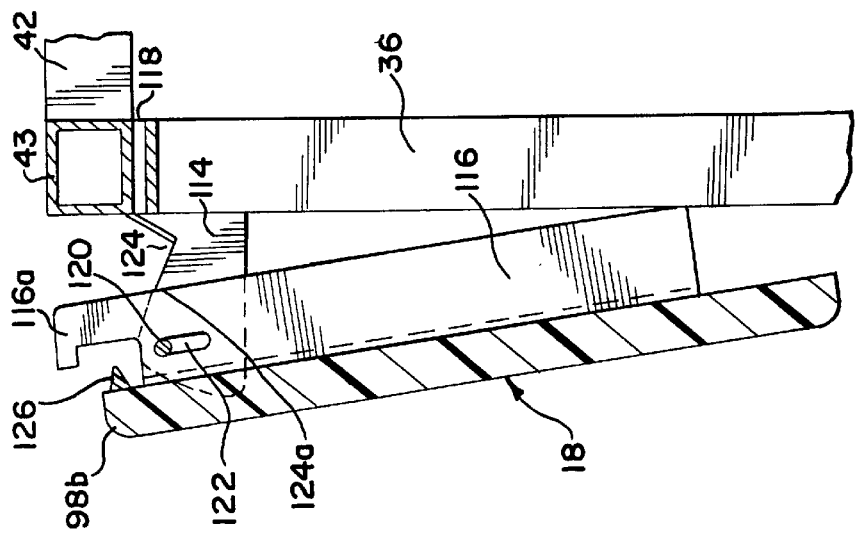
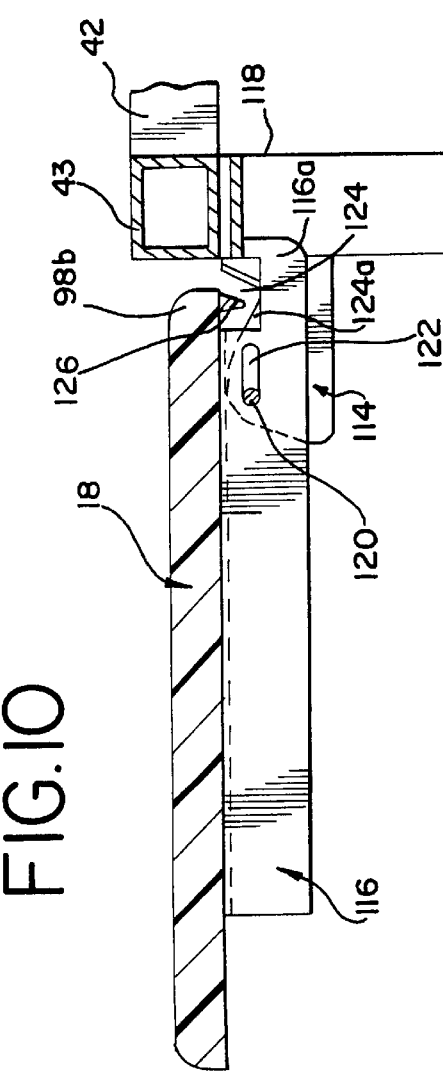
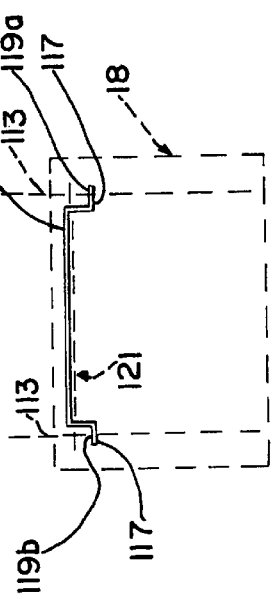

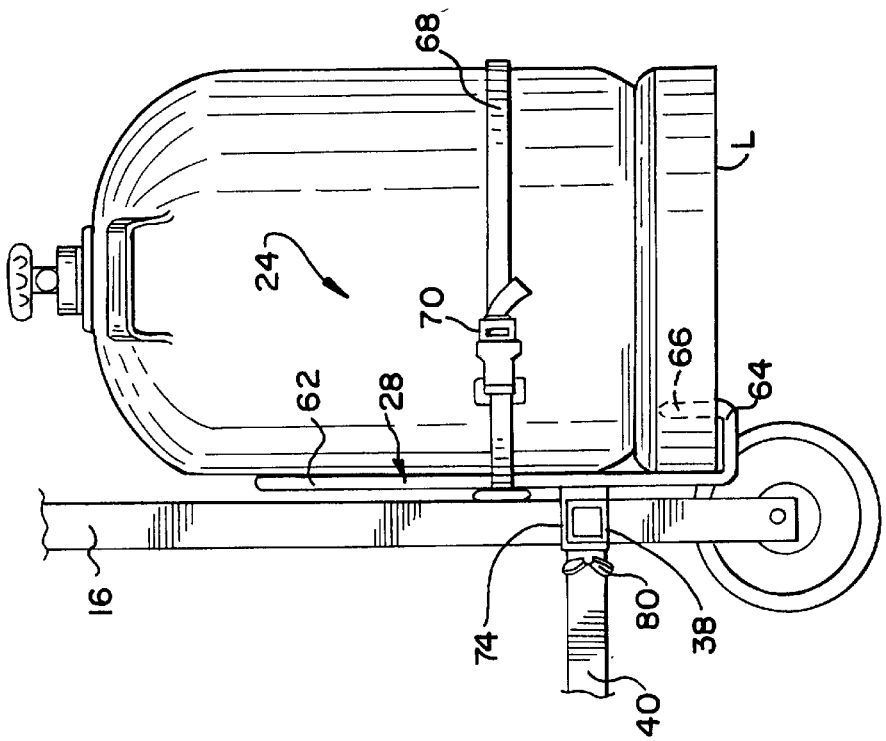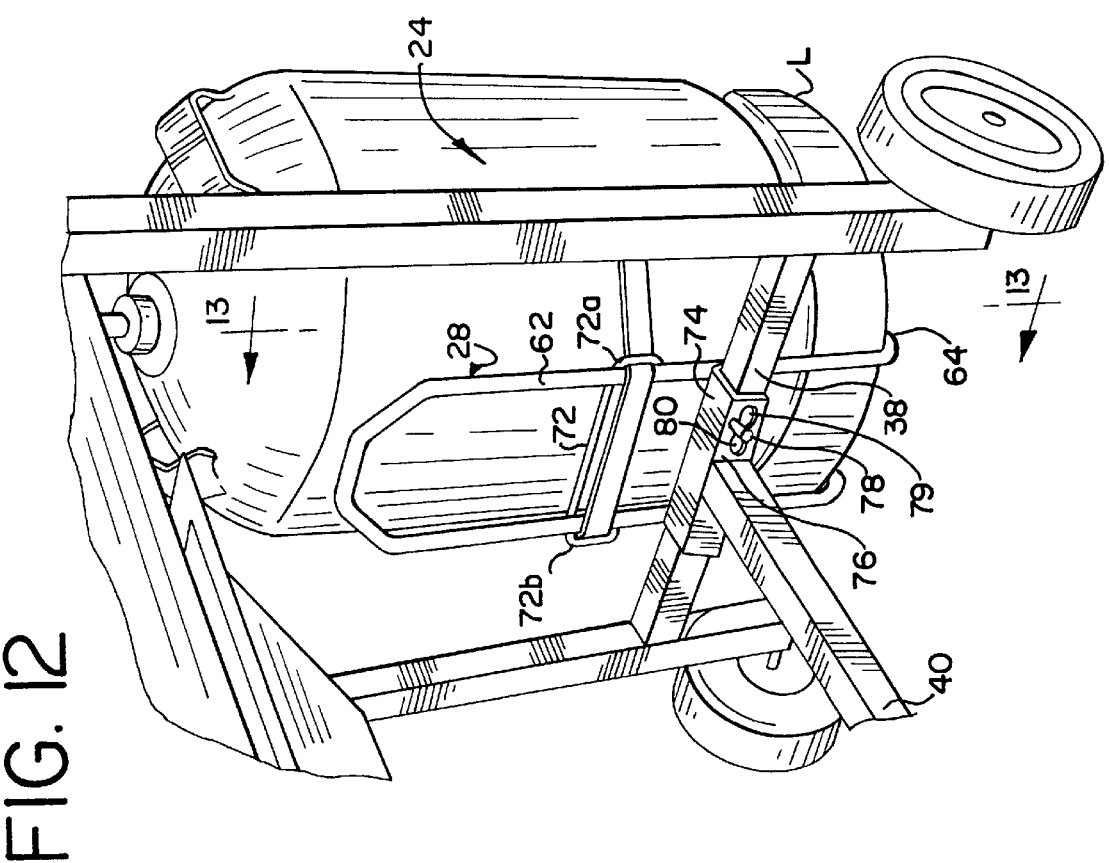

GRILL WITH IMPROVED PORTABILITY AND STORAGE CONFIGURATION

TECHNICAL FIELD

The present invention generally relates to outdoor cooking grills, and more particularly to a gas grill providing working surfaces and a gas supply system which are designed to improve portability of the grill and make it easier to store and reassemble for use.

BACKGROUND OF THE INVENTION

For various reasons, outdoor cooking grills are desirably portable. In recent years, and particularly in connection with gas grills, an effort has been made by the industry to increase cooking space and work space on the grill. Accordingly, size and complexity of the grills has increased. While certain of such grill designs have had a good degree of success, certain problems exist. For example, the added size and component complexity of these grills has reduced portability of the grills and has also made it more difficult to store the grills when not in use, such as in cold weather seasons.

It is an object of the present invention to provide a grill with ample cooking and work space but which is relatively easily transported and stored.

It is a further object to provide such a grill with features which provide enhanced structural stability and ease of operation and maintenance.

It is also an object to provide such a grill which is superior in construction with relatively minimum manufacturing cost and effort.

SUMMARY OF THE INVENTION

The present invention provides an improved grill including a burner housing, a frame to support the burner housing, work surfaces, a gas supply system and means to adjust the work surfaces and gas supply system between a cooking configuration and a storage configuration.

The means to adjust the work surfaces and gas supply system between a cooking configuration and a storage configuration may include a removable gas manifold and means for providing that the burner housing and work surfaces optionally define a first smallest perimeter, a second perimeter larger than the first, and a third perimeter larger than the second. The means to adjust may also include a fourth perimeter larger than the third perimeter.

According to one embodiment of the invention, a first side work surface is mounted adjacent a first burner housing end and being positionable between a substantially vertical position and a horizontal position. A second side work surface adjacent a second end of the burner housing is attached so as to optionally rest in a horizontal position while at least a portion thereof is liftable for access to a gas supply system. A front work surface adjacent at least a portion of a front side of the burner housing is optionally provided. The front work surface is positionable between a substantially vertical position and a horizontal position.

For added ease of disassembly for storage, and reassembly for use, a gas supply system according to the invention includes: a gas tank; a gas manifold; and, a means for providing that the gas supply system is conveniently attachable to the burner housing support frame based upon gravity and cooperation between a portion of the geometry of the gas supply system and a portion of the geometry of the support frame. Also, a means for removably attaching the manifold to the housing support frame is provided so that an exit port of the manifold is sufficiently aligned with an entry port of the burner so as to permit gas transfer therebetween. One means for removably attaching the manifold includes gravitationally suspending the manifold proximate the burner housing.

In a preferred construction, at least two spaced horizontal members are provided on the burner housing support frame, the burner housing being between the horizontal members. A portion of the horizontal members extends beyond the burner housing to define a gas manifold support structure. The gas manifold is gravitationally supported by the gas manifold support structure. Optionally the second work surface is a generally flat plate which is removably attached to the gas manifold support structure so that it can be lifted so as to permit access to the gas manifold.

In one preferred embodiment, a hanger having opposed first and second ends is provided. The first end of the hanger being attached to the manifold, the second end having a means to catch on a portion of the housing support frame. The hanger is dimensioned to permit the gas exit port to rest within at least a portion of the gas entry port so that the manifold is partially gravitationally supported thereby. One embodiment of this type provides that the hanger is a generally flat plate having a turned edge to catch a counter-turned edge on the housing support frame. A tongue extending from the plate, at an angle from a plane defined by the plate, is optionally provided. A wire rotatably mounted on the manifold support frame and defining a resilient cam portion having a rotation radius is provided to cooperate with the tongue to lock the plate in place for added security.

The gas container is conveniently assembled to the grill by placing it in a carriage which can then be mounted to the burner housing support frame based upon gravity and cooperation between a portion of the geometry of the gas supply system and a portion of the geometry of the support frame. In one embodiment of this type, a generally L-shaped carriage is removably attachable to the frame. The carriage has an elongate first portion, a second portion extending at an angle from the first portion, and an upturned grapple on the end of the second portion for engaging a lip underlying a gas container. Once the container is engaged by the grapple it can be secured to the carriage by an elongate, flexible strap which surrounds both the container and the first elongate portion of the carriage. A bracket on the carriage has a shape which geometrically cooperates with a portion of the frame having a shape adapted to receive the shape of the bracket.

Preferred work surfaces according to the invention have opposed side edges and opposed front and rear edges relative to the burner housing. The frame preferably used in connection with these work surfaces employs at least two vertical legs.

In one embodiment, a pair of slots, a pair of stops, and a pair of pivot posts, cooperate to provide a horizontal working position and a vertical storage position for a work surface. The pivot posts are engaged in and movable in the slots. A pair of lugs extend horizontally between the work surface and the legs so that when the lugs rest upon the stops, the work surface is supported in a horizontal position. The work surface can be lifted due to the sliding of the posts in the slots. Once lifted, the lugs are clear of the stops and the work surface can be rotated to a vertical storage position.

In another work surface embodiment according to the invention, the rear side of the work surface is pivotally mounted adjacent one side of the burner housing so as to optionally provide a vertical and a horizontal position. A brace having first and second ends is provided to support the work surface. The first end is hingeably connected adjacent opposed sides of the working surface. The second end has a portion thereof presenting inwardly-facing horizontal members. These horizontal members cooperate with brackets on the legs or optionally on a cross member between the legs. Each bracket has first and second upstanding members defining a slot therebetween. The slots are open at an upper end of the brackets so that the brace is engageable in the slots to support the working surface in a horizontal position.

Another work surface according to the invention is hingeable on a pair of brackets which extend horizontally from the burner housing support frame. The work surface is supported on a pair of underlying joists. The joists each have a portion thereof extending outwardly past the rear side of the work surface toward the housing. A pair of pins are cooperably engaged in, and movable within, horizontal slots. This connects the joists to the brackets to permit pivotal and horizontal movement of the joists. The pins, slots, joists, and work surface are all cooperatively dimensioned so that when the joists are lifted to a horizontal position, the pins and slots allow horizontal translation of the joists in a direction toward the burner housing so that the extended portion thereof may rest under stops provided on the frame so as to support the work surface in a horizontal position. When horizontally translated away from the burner housing, the extended portions clear the stops and permit rotation of the work surface to a vertical position.

Other advantages and aspects of the present invention will become apparent upon reading the following description of the drawings and detailed description of the invention.

BRIEF DESCRIPTION OF THE DRAWINGS

FIGS. 8 and 9 are cross-sectional views of a side work surface of the grill of FIG. 1 in a horizontal and a vertical position, respectively;

FIG. 8A is a schematic view of a brace for a positionable work surface in a preferred embodiment of the invention;

FIG. 8B is a schematic view of a preferred spring wire providing removable, pivotal connection of a work surface of the invention;

FIGS. 10 and 11 are cross-sectional views of an alternate side work surface in a horizontal and a vertical position, respectively;

FIG. 12 is a partial view of the grill of FIG. 1, in perspective; and,

FIG. 13 is a cross sectional view taken along line 13—13 of FIG. 12.

DETAILED DESCRIPTION

Figure 1:
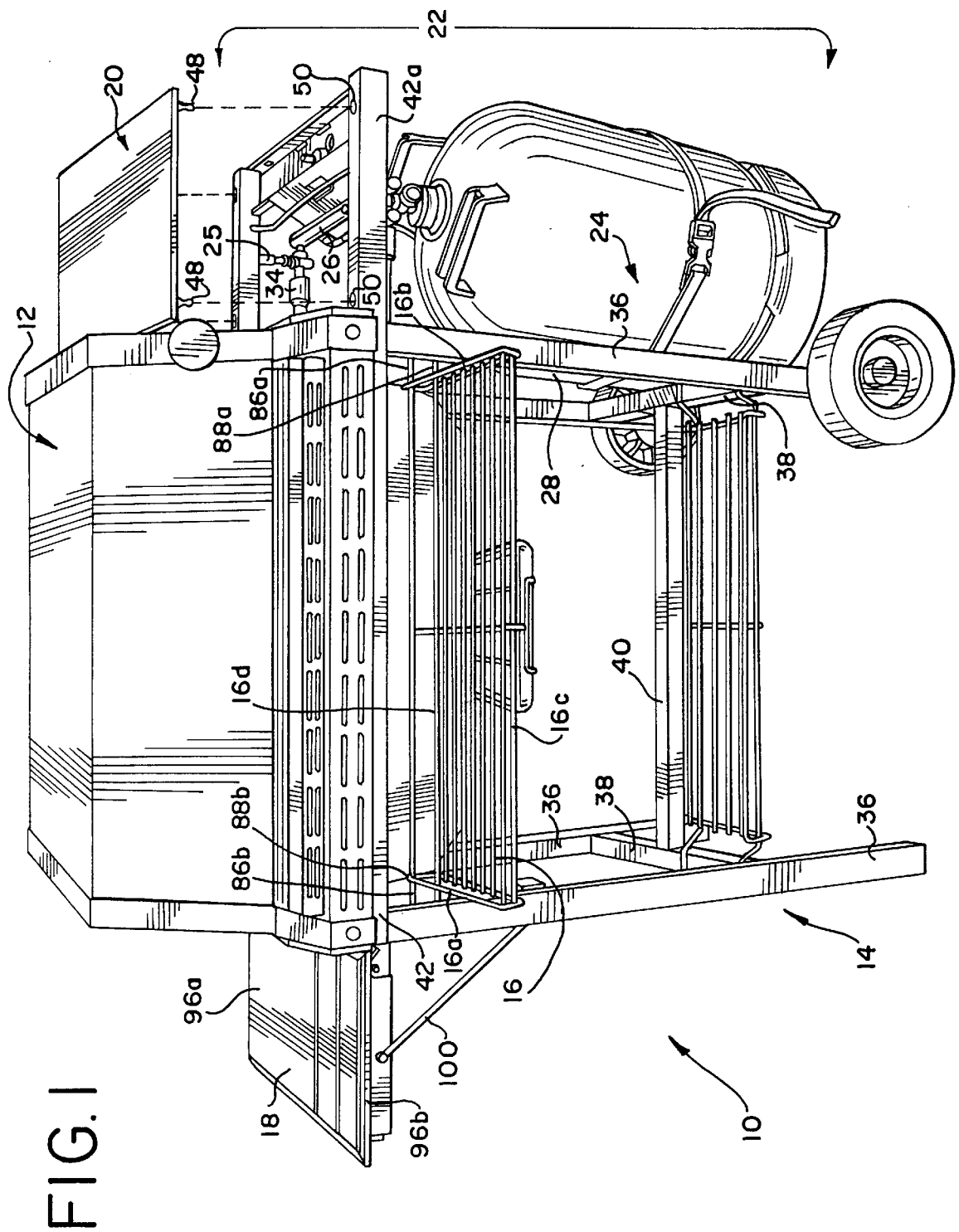
FIG. 1 is front perspective of a grill in accordance with the present invention.

While this invention is susceptible of embodiment in many different forms, there is shown in the drawings and will herein be described in detail, preferred embodiments of the invention with the understanding that the present disclosure is to be considered as an exemplification of the principles of the invention and is not intended to limit the broad aspect of the invention to the embodiments illustrated.

FIG. 1 discloses a grill 10 comprising: a burner housing 12; a frame 14 to support the burner housing 12; work surfaces 16, 18, and 20; and a gas supply system 22. According to the invention, these components provide a means for relatively easily adjusting the grill 10 between a cooking configuration and a storage configuration.

FIGS. 1–4, 12 and 13 disclose the details of the gas supply system 22. FIGS. 1 and 5–11 disclose the details of the work surfaces 16, 18, and 20 and the perimeters defined thereby.

FIGS. 1 and 5–11 disclose that work surfaces 16 and 18 are positionable between a horizontal cooking position and a vertical storage position. FIG. 1 discloses a work surface 20 removably attachable to grill 10. When work surfaces 16 and 18 are in a vertical position, and the work surface 20 is removed, the burner housing 12 and work surfaces define a first smallest perimeter around the grill. This configuration is ideal for moving and storing the grill 10. If any one of the work surfaces 16, 18 or 20 are in a horizontal cooking position, a second perimeter (larger than the first perimeter) around the grill 10, is defined. If two of work surfaces 16, 18 or 20 are in the horizontal cooking position, a third perimeter (larger than the second perimeter) is defined; if all working surfaces 16, 18, and 20 are in a horizontal cooking position, a fourth perimeter (larger than the third perimeter) is defined. Thus, there is provided ample working surface space with optional reduction thereof for using, moving, and storing the grill 10.

FIGS. 1–4, 12 and 13 disclose that, according to the invention, the gas supply system 22 includes a gas container or tank 24, a gas manifold 26, a carriage 28 for carrying the tank 24 and securing same to the grill 10. A gas transfer line 30 connects the manifold 26 to tank 24. A pair of valves 25 adjust a flow of gas to the burners. As will be disclosed in more detail below, the manifold 26 and carriage 28 are provided with specific structure to provide that the gas supply system 22 is attachable to the burner housing support frame based solely upon gravity and cooperation between a portion of the geometry of the gas supply system and a portion of the geometry of the support frame 14. As a result, the gas supply system 22 can be removed from the grill 10 as a unit without disconnecting the gas line 30. Also, no tools are needed to remove the gas supply system 22.

Figure 2:
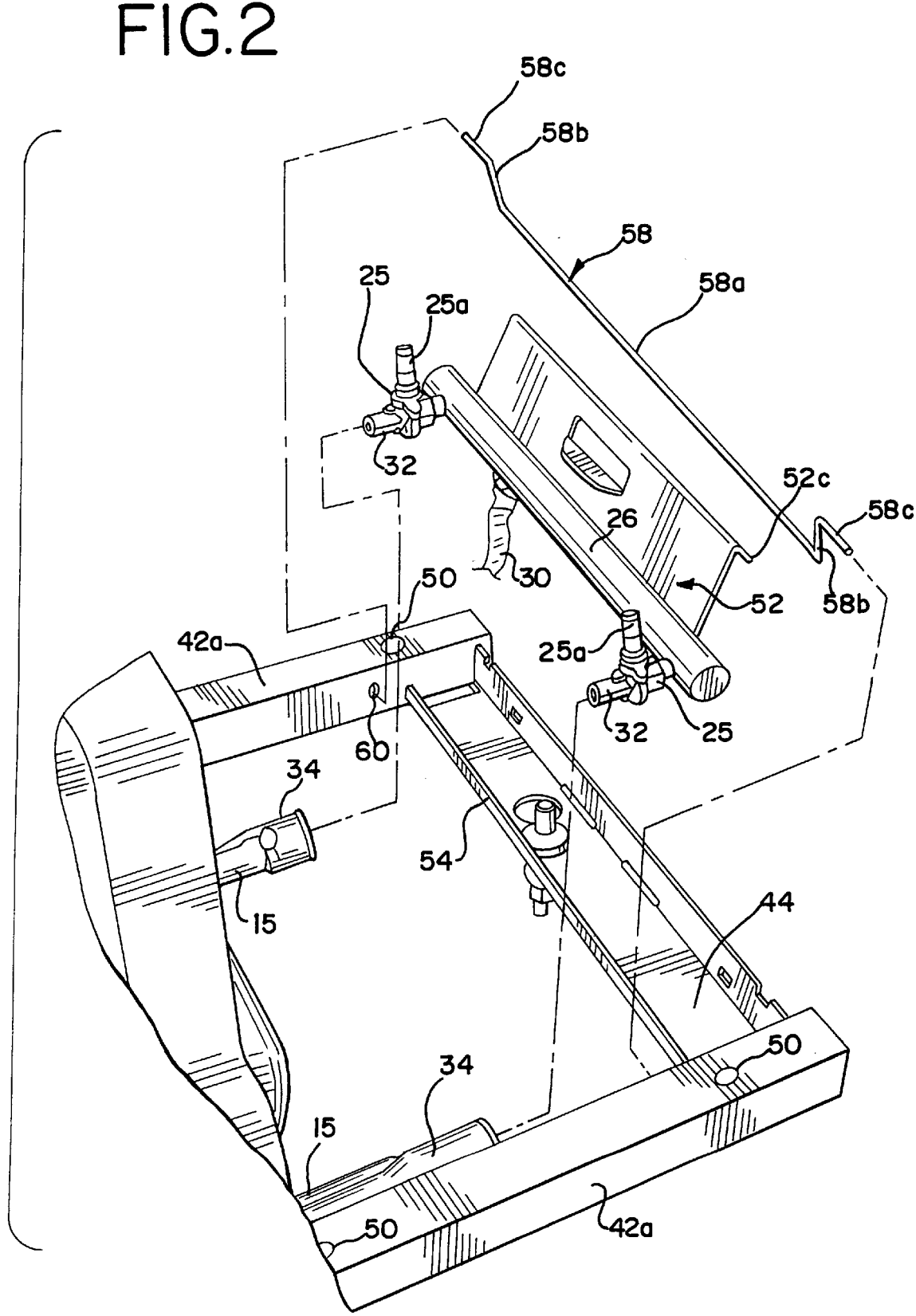
FIG. 2 is a partial view of the grill of FIG. 1, in perspective, showing a manifold construction thereof in exploded view.
Figure 3:
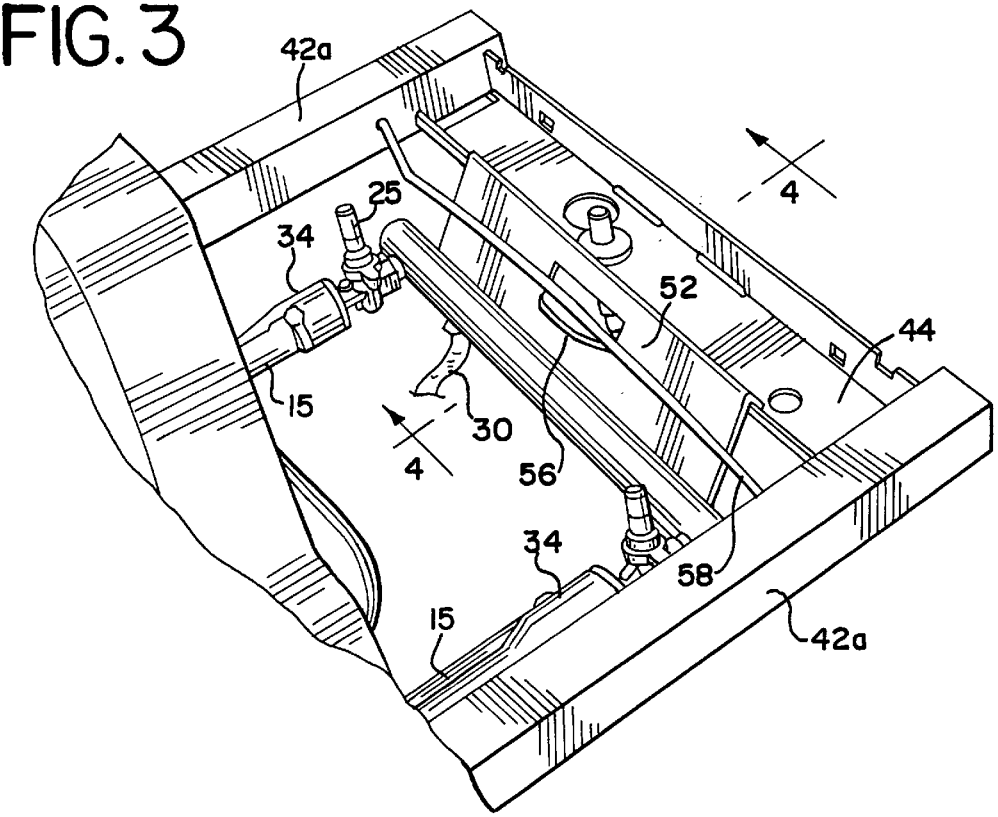
FIG. 3 is a partial view of the grill of FIG. 1, in perspective, showing a manifold construction thereof.
Figure 4:
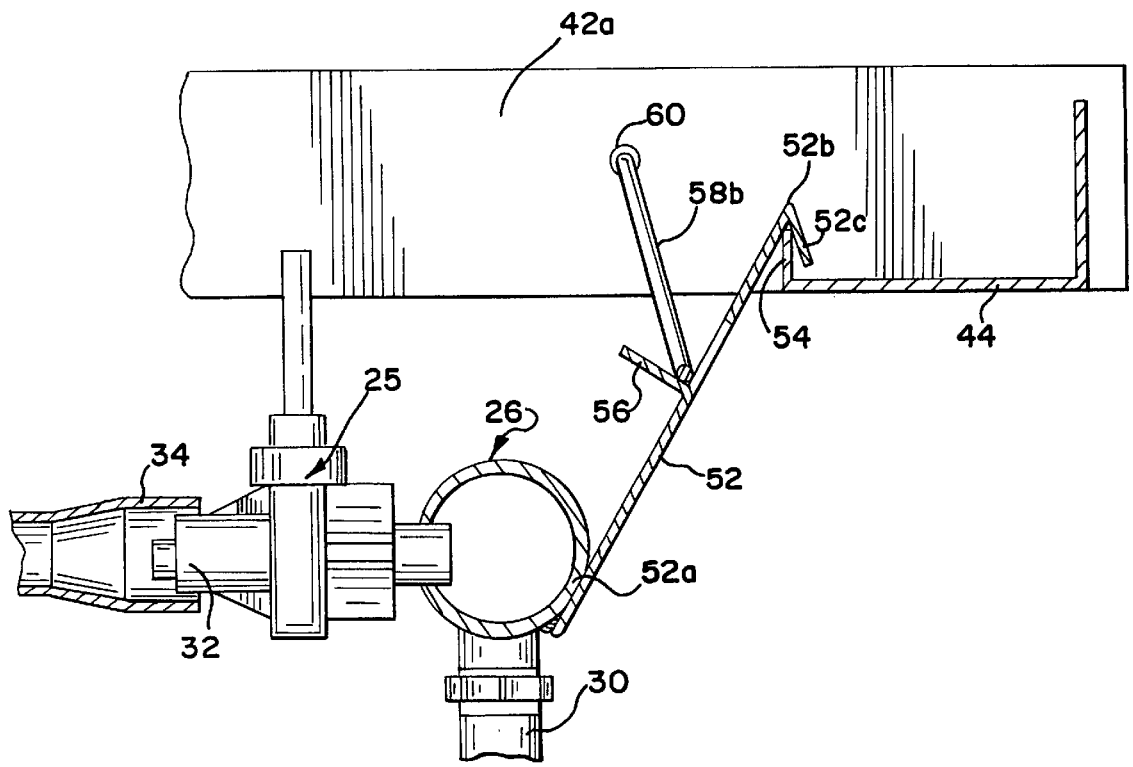
FIG. 4 is a cross-sectional view taken along line 4—4 of FIG. 3.

As can be seen in FIGS. 2–4, a preferred means for removably attaching the manifold 26 is to gravitationally suspend it proximate the burner housing 12 so that gas exit ports 32 thereof are sufficiently aligned with gas entry ports 34 of the burner 15 to permit gas transfer therebetween.

FIG. 1 discloses that support frame 14 preferably comprises four vertical legs 36 tied together adjacent a bottom portion thereof by cross members 38, which in turn are tied together by lower longitudinal member 40. Adjacent an upper portion of legs 36, the legs 36 are longitudinally joined by a pair of spaced horizontal members 42. The members 42 are tied together by horizontal upper cross members 43 (only one shown, in cross-section, in FIGS. 8–11) proximate the opposed ends of burner housing 12. In this configuration, a portion of the burner housing 12 is between the horizontal members 42.

A portion 42a of the horizontal members 42 extends beyond the burner housing 12 to provide a means for supporting the gas manifold 26. Adjacent an end of the portions 42a of members 42, a cross member 44 is attached between members 42. The portions 42a and the cross member 44 define a manifold support 46 from which to suspend or gravitationally support the gas manifold 26.

In the preferred embodiment disclosed, the manifold 26 is suspended from manifold support 46 by a generally flat plate defining a hanger 52. The hanger 52 has one end 52a attached, such as by brazing or welding, to manifold 26. An opposed end 52b of hanger 52 has a turned edge 52c to catch a counter-turned edge 54 on cross member 44 of manifold support 46. Thus, to install the manifold 26 for cooking, the manifold 26 may be raised from below, (depending on relative dimensions, in some cases it may have to be tilted to do so) then aligned and lowered to a position where the gas exit ports 32 align in the gas entry ports 34 of the burner 15. Then, the turned edge 52c is fitted over and hangs from counter-turned edge 54. At this point, merely gravity and the geometry of the components secure the manifold to the grill in an operable configuration. If dimensions do not permit in a particular embodiment, the gas line 30 may be removed from the tank 24 and the manifold 26 installed from above.

For added safety, such as to prevent dislodging due to impacts to the grill 10 during cooking, means call be optionally provided to lock the manifold 26 into place. One preferred means is provided by a tongue 56 formed from a medial portion of the hanger 52, and a wire 58. The tongue 56 extends outwardly from a plane defined by the plate-shape of the hanger 52. The wire 58 is rotatably mounted on the manifold support frame 46. More particularly, the wire 58 is shaped into a resilient cam comprising a center portion 58a, legs 58b, and out-turned ends 58c of wire 58. The ends 58c are engaged in holes 60 in members 42a of the manifold support 46 for rotation. A length of the legs 58b define a radius of rotation. The legs 58b, the tongue 56, and the hanger 52 are dimensioned such that the hanger 52, when in cooking position, is positioned slightly within the rotation radius of wire 58. In this configuration, the wire 58 can be rotated to a position against the tongue 56. At such point, at least the portion 58a is elastically deformed sufficiently to urge the plate hanger 52 against the counter-turned edge 54 and against a portion of the gas entry ports 34.

FIGS. 12 and 13 disclose more details regarding the carriage 28 of gas supply system 22. According to the invention, the carriage 28, like the manifold 26, provides a removable attachment of the gas supply system 22 to the housing support frame 14 based upon gravity and cooperation between a portion of the geometry of the gas supply system and a portion of the geometry of the support frame.

In particular, carriage 28 is generally L-shaped and comprises an elongate first portion 62, a second portion 64 extending at an angle from the first portion 62, and an upturned grapple 66 on the end of the second portion 64 for engaging a lip underlying a gas tank 24 (referenced by "L" in FIGS. 12 and 13). As a means for securing a container in place on the carriage, an elongate, flexible strap 68 is provided. The strap 68 surrounds both the tank 24 and the first elongate portion 62 of the carriage 28. A conventional tightening buckle 70 is used to tighten and lock the strap 68. Strap 68 is threaded through end loops 72a and 72b of a second rubber strap 72 to hold the strap 68 in place on elongate member 62 when first securing a tank onto the carriage 28.

The carriage 28 is mounted on the frame 14 via a bracket 74 welded to the elongate member 62 of the carriage 28. The bracket 74 is a three-sided rectangular shape so as to fit over a portion of cross member 38 of the frame 14 which is a square tube. The bracket 74 has a square notch 76 (FIG. 12) to accommodate longitudinal member 40 of frame 14. The notch 76 also helps prevent sideways sliding of the bracket 74. Thus, the rectangular shape of the bracket 74 cooperates with the rectangular cross-sectional shape of a portion of the frame 14 to secure the carriage 28 and thereby the tank 24 to the frame 14 and burner housing 12.

The carriage 28 is held in place by this geometry and the weight of the carriage 28 and tank 24. The tank 24 can thus be removed by simply lifting it and carriage 28 off of cross member 38. Alternatively, the buckle 70 can be loosened and the tank 24 removed from the carriage 28, leaving the carriage on frame 14. If added safety precautions are desired, a means to lock the carriage onto the frame once it is in position may be employed. For example, a slot 78 could be placed into one side of the bracket 74 to slide over a threaded bolt 79 extending from cross member 38, which could then be secured by a wing nut 80.

FIG. 1 discloses that working surface 20 is conveniently supported on the gas manifold support 46. The work surface 20 is attached by spring clips 48 engaging in holes 50, so as to permit the work surface 20 to be lifted to permit access to the gas manifold 26. However, access may be had to the manifold 26 if work surface 20 could be hingeably attached, so as to be liftable for access. Similarly, just a portion of work surface 20 could be removable or liftable. If access from above is not desired, work surface 20 could be permanently attached to manifold support 46.

FIGS. 1 and 5–7 disclose work surface 16 mounted adjacent two vertical legs 36. The work surface 16 has opposed side edges 16a and 16b and opposed front and rear edges 16c and 16d. Means are provided to permit smooth adjustment of work surface 16 between a cooking (horizontal) position and a storage (vertical) position. A preferred means includes: a pair of slots 82, one slot 82 on each of the legs 36; a pair of stops 84, one stop 84 extending from each of legs 36, the stops 84 being horizontally and vertically offset from the slots 82; a pair of pivot posts 86, one attached to each of the opposite sides 16a, 16b of the work surface 16 proximate a rear edge 16d thereof. The pivot posts 86 are engaged in and movable in the slots 82. This permits the work surface 16 to be lifted and rotated for changing its position. A pair of lugs 88 are also attached to each opposed side 16a, 16b of the work surface 16, and each lug 88 extending horizontally between the work surface 16 and the legs 36.

Figure 7:
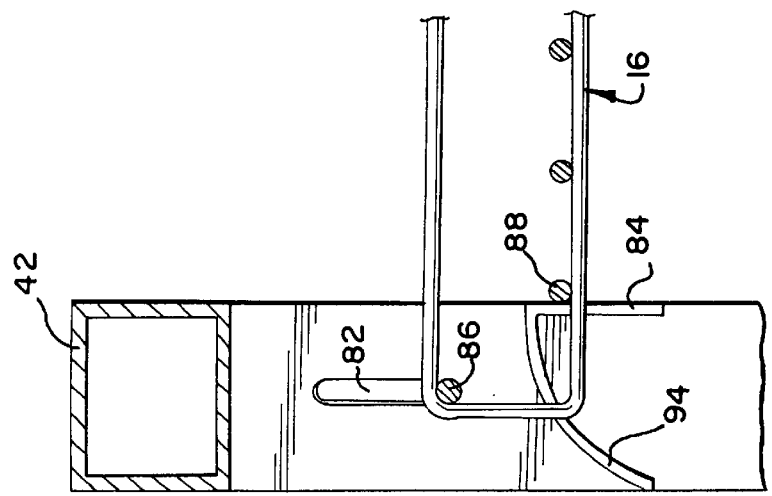
FIGS. 6 and 7 are cross-sectional views taken along line 6—6 of FIG. 5, showing a work surface in a vertical and a horizontal position, respectively, and showing a transition thereof in phantom.

As disclosed in FIG. 7, the lugs 88 are vertically and horizontally offset from the pivot posts 86 in substantially the same direction and degree as the stops 84 are offset from the slots 82 so that when the lugs 88 rest upon the stops 84, the work surface 16 supported thereby, is in a horizontal position.

While not necessary to providing the above-discussed structure in other embodiments of a work surface, work surface 16 is comprised of a plurality of rods 90 oriented in a first direction and tied together by transverse wire loops members oriented in a direction transverse to the rods 90. Conveniently, in this embodiment, the pivot posts 86 are defined by opposed ends 86a and 86b (FIG. 1) of one of the continuous rods 90 incorporated into the working surface 16. Also, the lugs 88 are defined by opposed ends 88a, 88b of another of a continuous rod 90 incorporated into the working surface 16.

Figure 6:
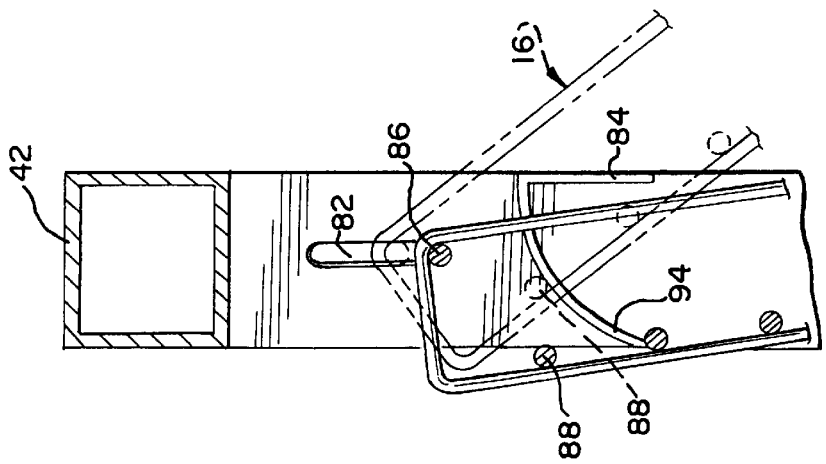
Figure 5:
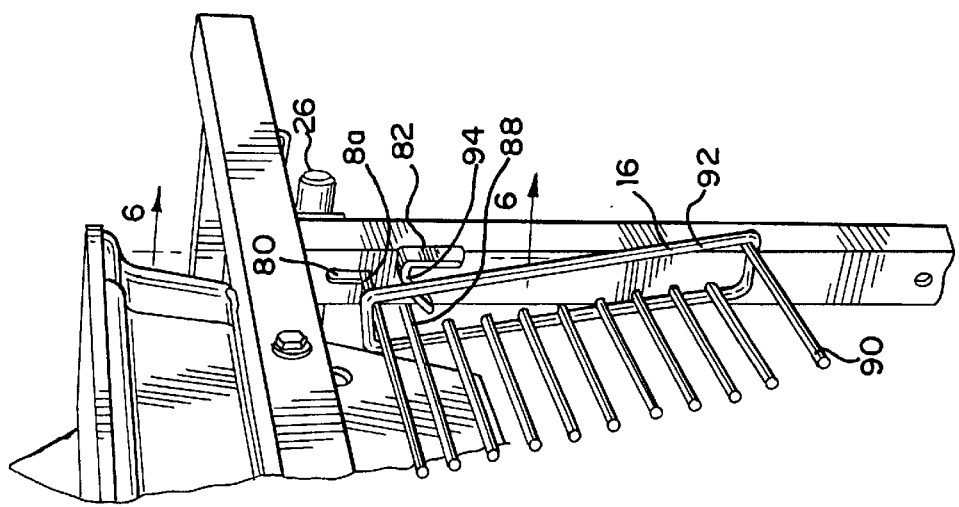
FIG. 5 is a partial view of the grill of FIG. 1, in perspective.

FIGS. 5–7 disclose a guide wall 94 adjacent each stop 82. As disclosed in FIG. 6, the guide walls 94 provide an arcuate surface for sliding engagement of lugs 88 thereon, and act as a guide for the lugs 88 during movement of the working surface to assist in a smooth transition between vertical and horizontal positions of the work surface 16. Specifically, only rotational force need be applied to work surface 16 because the guides 94 will provide translational upward movement until the work surface 16 is horizontal. At that point the lugs 88 have cleared the guides and the work surface 16 can drop so that the lugs 88 are resting on the stops 84. The guide walls 94 are shaped and dimensioned to also urge the lugs 88 into a storage position when the work surface 16 is vertically positioned so as to maintain stability of the work surface 16 during movement of the grill 10.

It should be appreciated that the work surface 16 can be adapted to be easily removed for cleaning and storage as follows. The work surface 16 may be tilted so that one post 86 moves toward a top of one slot 82, while the opposite post 86 moves toward the bottom of the other slot 82. If a length of the slots 82, and a depth of intrusion into the slots 82 by pins 86, are cooperatively dimensioned, then when tilted as just set forth, both posts 86 will clear the slots 82 and the work surface 16 can be withdrawn from the burner housing frame 14. To ensure that the pivot posts 86 do not prematurely exit slots 82 during normal use, an outer end of each can be down-turned sufficiently to prevent its withdrawal if not tilted as described above.

FIGS. 1, 8 and 9 disclose details of work surface 18 which has opposed sides 96*a*, 96*b* and opposed front and rear sides 98*a*, 98*b* relative to the burner housing. The rear side 98*b* of the work surface 18 is pivotally mounted adjacent one side of the burner housing 12 so as to optionally provide a vertical and a horizontal position. A brace 100 is defined by a rod or wire bent into a three-sided rectangular shape (FIG. 8A) having a first end 100*a* hingeably connected adjacent opposed sides 96*a*, 96*b* of the working surface 18 and a second end 100*b* defining inwardly-facing horizontal portions 100*c*, 100*d*. Each side 96*a*, 96*b* of the working surface 18 has a hole 102 adjacent thereto. Each end of the rod comprising brace 100 is bent to provide inwardly-turned portions 100*e*, 100*f* which engage within the holes 102 to provide a hingeable connection therebetween.

A brace bracket 104 is attached to each of two vertical legs 36 adjacent the work surface 18. The brackets 104 each have first and second upstanding members 106, 108 defining a slot 110 therebetween. The slots 110 are open at an upper end of the brackets 104. The horizontal portions 100*c*, 100*d* of the brace 100 are engageable in the slots 110 to support the working surface 18 in a horizontal position. The first upstanding member 106 is longer than the second upstanding member 108 so that while the working surface 18 is being lifted from its vertical storage position, the horizontal portions 100*c*, 100*d*, of the brace 100 will drop over the shorter second upstanding member 108. The first member 106 will then resist further movement and allow proper alignment of portions 100*c*, 100*d* into the slots 110. Optionally, the second upstanding members 108 can be provided with a guide surface 112 for guiding the horizontal members 100*c*, 100*d* of the brace 100 when the work surface 18 is initially lifted. In another embodiment, the brace 100 could cooperate with such as brackets 104 mounted on cross member 38 or with a single bracket 104 mounted on longitudinal member 40.

To increase the portability and maintenance of the grill 10, the hingeable connection of work surface 18 in the above described embodiment can be accomplished as disclosed in FIGS. 8 and 9. Specifically, the burner housing frame 14 has a pair of brackets 113 extending therefrom. The brackets 113 each have a hole 115. The holes 117 line up with holes 117 on the work surface 18. Out-turned ends 119*a* and 119*b* of spring wire 119 having a generally rectangular 3-sided shape (FIG. 8B) act as hinge pins engaging through holes 115, 117. The spring wire 119 can be rotated and resiliently urged into a protruding lip 121 along a rear side of work surface 18. In this configuration (disclosed in FIGS. 8, 8A and 9), the hingeable connection cannot be dislodged during normal use. When it may be desired to remove the work surface 18 for cleaning, the resiliency of the spring wire 119 can be overcome and it can be rotated away from the protruding lip 121. The spring wire 119 can then be compressed end to end, until one of its ends 119*a*, 119*b* are free of the holes 115, 117 and then the other end may easily exit the remaining holes 115, 117. At this point, the work surface is removed. In similar manner, without tools, work surface 18 can be reassembled to the frame 14.

FIGS. 10 and 11 disclose an alternate support system for work surface 18. In this embodiment, a pair of brackets 114, are mounted, one each, on the two opposed legs 36 most adjacent the work surface 18. The brackets 114 extend horizontally away from the burner housing 12. The work surface 18 is provided with a pair of underlying joists 116, one joist 116 adjacent the first side 96*a* and one adjacent the second side 96*b* of the work surface 18. The joists 116 each having a portion 116*a* thereof extending outwardly past the rear side 98*b* of the work surface 18 toward the burner housing 12. A pair of stops 118 are provided, one adjacent each leg 36 and in line with the extended portions 116*a* of joists 116. A pair of pins 120 cooperably engage in and are movable within, horizontal slots 122 (one pin 120 on of each of the joists). The pins 120 and slots 122 thereby connecting the joists 116 to the brackets 114 and permitting pivotal and horizontal movement of the joists 116. The pins 120, slots 122, joists 116, stops 118, legs 36, and work surface 18 all being cooperatively dimensioned so that when the work surface 18 (and thereby the joists 116) are lifted to a horizontal position, the pins 120 and slots 122 allow horizontal translation of the work surface 18 (and the joists 116) in a direction toward the burner housing 12 so that the extended portions 116*a* thereof may rest under the stops 118 to support the work surface 18 in a horizontal position. This configuration also provides that when the work surface 18 is horizontally translated in a second direction away from the burner housing 12, the portions 116*a* clear the stops 118 to permit rotation of the work surface to a vertical position. Optionally, a means for indicating when the work surface 18 is not fully translated in the first horizontal direction, and therefore perhaps not fully supported, can be provided. Such a means is disclosed in FIGS. 10 and 11. In particular, a notch 124 on the brackets 114 cooperates with a projection 126 extending from the work surface 18. The protrusion 126 and notch 124 are positioned so that the protrusion 126 interferes with horizontal alignment of the work surface 18 except when fully engaged in the notch 124. An inclined side 124*a* of notch 124 provides smooth transitioning to the full horizontal position of work surface 18.

While the specific embodiments have been illustrated and described, numerous modifications come to mind without significantly departing from the spirit of the invention and the scope of protection is only limited by the scope of the accompanying claims.

For example, for the purposes of the invention, the terms "removable", "removably attached", and "detachable" means to be attached in such a manner so as to be separated or removed generally without use of tools. These terms also mean to be attached without use of fasteners or means for fastening which are normally be used when it is intended to provide permanent construction during normal use and storage (except for replacement) such as, screws, bolts, welds, solders, glues, crimping, staking, or the like.

Where cooperable parts, such as pins, in slots are disclosed, one on a first component and the other on a second component, it should be understood that the pin and slot could be attached to either component so long as they cooperate.

Also, the work surfaces 16, 18, and 20, the manifold 26, and hanger 52 as well as numerous associated components could be used with a natural gas supply on a fixedly mounted grill.

Also, hanger 52 could be made from wire, strips of thin sheet stock, cables, chains or the like.

Also, while the work surfaces disclosed herein are described as having opposed side edges and opposed front and rear edges, it should be understood that these descriptions define relative orientation and spacing with respect to the burner housing and frame components, and are not intended to restrict work surfaces according to the invention to rectangular shapes. The invention also contemplates shapes other than rectangular, such as rounded, segmented and polygonal.

Also, the work surfaces may employ auxiliary apparatus, such as gas-control knobs or burners. Specifically, knobs may be employed on work surface 20 to engage with extended portions 25a of valves 25 (with the appropriate holes being positioned in the work surface 20) for control of the gas flow from atop the working surface 20.

Also, the manifold 26 could be removable by securement: in slots; by spring clips; by resting in a cradle; or the like.

Also, the carriage 18 is made of a substantially continuous wire or rod bent into the described elements. However, carriage 18 could be made of a solid (metal or plastic) sheet stock or the like to form the disclosed elements.

We claim:

1. A grill comprising:
   a burner housing supported on a frame, the burner housing having a burner with an entry port exposed from the burner housing, a gas supply system having a removable gas manifold in fluid communication with said entry port when an exit port of the manifold is sufficiently aligned with said entry port of the burner tube; and,
   means for adjusting the gas supply between a cooking configuration and a storage configuration, the means for adjusting the gas supply including a hanger having a first portion engaged with the removable gas manifold and a second portion engaged with a portion of a horizontal frame member extending adjacent the burner housing.

2. The grill of claim 1, wherein the means for adjusting the gas supply between a cooking configuration and a storage configuration further comprises:
   the removable gas manifold being gravitationally suspended from the housing support frame by an underside edge at the second portion of the hanger fitting over an opposed edge of said portion of the horizontal member.

3. The grill of claim 1, wherein the means for adjusting the gas supply includes a means for locking the manifold sufficiently aligned with an entry port of the burner to permit gas transfer therebetween, said means for locking the manifold in position including a tongue extending outwardly of a plane of the hanger second end.

4. A grill comprising:
   a burner housing supported on a burner housing support frame, the burner housing having a burner with an entry port exposed from the burner housing, a gas supply system having a removable gas manifold in fluid communication with said entry port when an exit port of the manifold is sufficiently aligned with said entry port of the burner tube, the means for adjusting the gas supply between a cooking configuration and a storage configuration includes:
   at least two spaced horizontal members on the burner housing support frame, the burner housing being between the horizontal members;
   a portion of the horizontal members extending beyond the burner housing to define a gas manifold support; and,
   the gas manifold supported upon an edge of the gas manifold support.

5. The grill of claim 4 including a means for locking the manifold in place when the exit port is sufficiently aligned with the entry port of the burner.

6. The grill of claim 5 wherein the means for locking the manifold in place comprises a tongue extending outwardly from a plane defined by a plate portion of the hanger.

7. A gas grill comprising:
   a burner housing supported by a frame, the burner housing having a burner with an entry port exposed from the burner housing, the entry port being in fluid communication with a gas manifold when in an operational configuration whereby an exit port of the manifold is aligned with said entry port of the burner; and,
   means for removably attaching the manifold to the frame independently from the burner housing when said manifold is aligned with said burner, the means for removably attaching including the frame having at least one horizontal member extending beyond the housing and having an edge engaged with an opposed edge of a hanger, the manifold being suspended by the hanger in said operational configuration.

8. The grill of claim 7 wherein the means for removably attaching includes a means for locking the manifold in said aligned position of said operational configuration.

9. The grill of claim 8, wherein the means for locking the manifold in said aligned position comprises a tongue extending outwardly from a plan defined by a plate portion of the hanger.

10. A gas grill comprising:
    a burner housing supported by a frame, the burner housing having a burner with an entry port exposed from the burner housing, the entry port being in fluid communication with a gas manifold being in an operational configuration when an exit port of the manifold is aligned with said entry port of the burner; and,
    means for removably attaching the manifold to the frame independently from the burner housing including
    a hanger having opposed first and second ends, the first end being attached to the manifold, the second end having a surface engageable with a portion of the housing support frame.

11. The grill of claim 10 wherein the gas exit port has an outer diameter less than an inner diameter of the entry port and is adapted to rest within at least a portion of the gas entry port.

12. The grill of claim 11, wherein the hanger is a generally flat plate having a turned edge to catch a counter-turned edge on the housing support frame, the plate including:
    a tongue extending from the plate;
    a wire rotatably mounted on the manifold support frame and defining a resilient cam portion having a rotation radius, the plate being positioned within the rotation radius allowing the wire to rotate to a position against the tongue and at such point, the wire resiliently urging the plate against the counter-turned edge and a portion of the gas entry port.

13. The grill of claim 10 wherein the hanger is a generally flat plate having a turned edge to catch a counter-turned edge on the housing support frame.

14. A grill comprising:

a burner housing having a frame to support the burner housing;

a means for providing that a gas supply system is removably attachable to the burner housing support frame based upon gravity and cooperation between a portion of the geometry of the gas supply system and a portion of the geometry of the support frame, the means for securing the gas supply system to the frame having a generally L-shaped carriage removably attached to the frame, the carriage having an elongate first portion, a second portion extending at an angle from the first portion, and an upturned grapple on the end of the second portion for engaging a lip underlying a gas container.

15. The grill of claim 14 including a means for securing the container to the carriage.

16. The grill of claim 15 wherein the means for securing includes an elongate, flexible strap that surrounds both the container and the first elongate portion of the carriage.

17. The grill of claim 14 wherein the means for securing the gas supply system to the frame includes:

a bracket on the carriage, the bracket having a shape; and a portion of the frame having a shape adapted to receive the shape of the bracket for securement thereto.

18. The grill of claim 17 including means to lock the carriage onto the frame once received by the frame.

19. The grill of claim 19, further including:

a burner in the housing having a gas entry port;

a gas manifold having a gas exit port; and, means for removably attaching the manifold to the frame, the exit port thereof being sufficiently aligned with the entry port of the burner to permit gas transfer therebetween.

20. The grill of claim 14, wherein the means for providing that the gas supply system is removably attached to the frame, further includes:

a manifold support adjacent the burner housing in proximity with the gas entry port; and, the gas manifold being suspended from at least the manifold support frame.

21. The grill of claim 20 including a means to lock the manifold in position suspended from the manifold support frame.

22. A grill comprising:

a burner housing;

at least two vertical legs supporting the burner housing, each leg having a side thereof facing the other;

a work surface having opposed side edges and opposed front and rear edges;

a pair of slots, one slot on either, each of the legs, or opposite sides of the work surface;

a pair of stops, one stop extending from each of the other of each of the legs or opposite sides of the work surface, the stops being horizontally and vertically offset from the slots;

a pair of pivot posts, one attached to either of each leg, or the opposite sides of the work surface proximate a rear edge thereof, the pivot posts being engaged in and movable in the slots;

a pair of lugs, one attached to either, each of the legs, or at each opposed side of the work surface, which ever not having a stop, the lug extending horizontally between the work surface and the legs, the lugs being vertically and horizontally offset from the slots in substantially the same direction and degree as the stops so that when the lugs rest upon the stops, the work surface is in a horizontal position.

23. The grill of claim 22, wherein the work surface comprising:

a plurality of rods oriented in a first direction and tied together by transverse members oriented in a direction transverse to the rods.

24. The grill of claim 22, wherein the pivot posts are defined by opposed ends of a continuous rod incorporated into the working surface.

25. The grill of claim 22, wherein the lugs are defined by opposed ends of a continuous rod incorporated into the working surface.

26. The grill of claim 22, further comprising:

a guide wall adjacent each stop, the guide wall providing a surface for sliding engagement of a respective lug thereon and providing a guide for the lug during movement of the working surface between horizontal and vertical positions of the work surface.

27. The grill of claim 26 wherein the guide wall being shaped and dimensioned to also urge the lug into a storage position when the work surface is vertically positioned so as to maintain stability of the work surface during movement of the grill.

28. The grill of claim 26 wherein the guide wall being arcuate.

29. The grill of claim 22, wherein a length of the slots 82, and a depth of intrusion into the slots 82 by pins 86, are cooperatively dimensioned so that when work surface 16 is tilted in a manner such that one pin 86 moves toward a top of one slot 82, while the opposite pin 86 moves toward the bottom of the other slot 82, both pins 86 will clear the slots 82 and the work surface 16 can be withdrawn from the burner housing frame 14.

30. A grill comprising:

a burner housing having sides and being supported by a frame;

a pair of brackets, each bracket extending horizontally from the frame;

a work surface having opposed first and second sides and opposed front and rear sides relative to the burner housing, and including a pair of underlying joists, one joist adjacent the first side and one adjacent the second side of the work surface, the joists each having a portion thereof extending outwardly past the rear side of the work surface toward the burner housing;

a pair of stops on the frame; and, a pair of pins cooperably engaged in and movable within horizontal slots, one pin being on either of each of the joists, or each of the brackets and one slot being on each of the other of the joists or brackets, the pins and slots thereby connecting the joists to the brackets and permitting pivotal and horizontal movement of the joists;

the pins, slots, joists, stops, and work surface all being cooperatively dimensioned so that when the joists are lifted to a horizontal position, the pins and slots allow horizontal translation of the joists in a direction toward the burner housing so that the extended portion thereof may rest on the stops to support the work surface in a horizontal position, and horizontally translated in a second direction away from the burner housing so as to clear the stops for rotation of the work surface to a vertical position.

31. The grill of claim 30 including:

a means for indicating when the work surface is not fully translated in the first horizontal direction so as to be fully supported by the extended portion of the joists resting on the stops.

32. The grill of claim 31 wherein the means for indicating including:

a notch on either of a bracket or the work surface and a projection on the other of either the bracket or work surface, the protrusion and notch being positioned so that the protrusion interferes with horizontal alignment of the work surface except when fully engaged in the notch.

33. The grill of claim 32 wherein the notch having one inclined side.

* * * * *